United States Patent
O'Connell et al.

(10) Patent No.: US 11,783,840 B2
(45) Date of Patent: Oct. 10, 2023

(54) VIDEO CONFERENCE VERBAL JUNCTION IDENTIFICATION VIA NLP

(71) Applicant: KYNDRYL, INC., New York, NY (US)

(72) Inventors: Brian M. O'Connell, Cary, NC (US); Zachary A. Silverstein, Georgetown, TX (US); Michael John Lyons, Strathdale (AU); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 149 days.

(21) Appl. No.: 17/509,992

(22) Filed: Oct. 25, 2021

(65) Prior Publication Data
US 2023/0125307 A1 Apr. 27, 2023

(51) Int. Cl.
*G10L 17/06* (2013.01)
*G10L 17/22* (2013.01)
*H04L 65/403* (2022.01)
*G10L 15/26* (2006.01)
*G10L 17/00* (2013.01)
*G10L 25/48* (2013.01)

(52) U.S. Cl.
CPC .............. *G10L 17/06* (2013.01); *G10L 15/26* (2013.01); *G10L 17/00* (2013.01); *G10L 17/22* (2013.01); *G10L 25/48* (2013.01); *H04L 65/403* (2013.01)

(58) Field of Classification Search
CPC ......... G10L 17/06; G10L 15/26; G10L 17/00; G10L 17/22; G10L 25/48; H04L 65/403
USPC ....................................................... 704/231
See application file for complete search history.

(56) References Cited

U.S. PATENT DOCUMENTS

| | | | | |
|---|---|---|---|---|
| 6,652,283 | B1 * | 11/2003 | Van Schaack | G09B 7/04 434/323 |
| 7,170,545 | B2 * | 1/2007 | Rodman | H04L 65/403 348/E7.083 |
| 9,148,627 | B2 * | 9/2015 | Anderson | H04N 7/15 |

(Continued)

FOREIGN PATENT DOCUMENTS

| | | |
|---|---|---|
| JP | 2004030328 | 1/2004 |
| JP | 2017111643 | 6/2017 |
| KR | 20170139989 | 8/2006 |

OTHER PUBLICATIONS

Calyam et al., "Measuring Interaction QoE in Internet Videoconferencing", IFIP, 2017, 12 pages.

(Continued)

*Primary Examiner* — Edwin S Leland, III
(74) *Attorney, Agent, or Firm* — Erik Swanson; Andrew M. Calderon; Calderon Safran & Cole P.C

(57) ABSTRACT

A computer-implemented system, method, and computer program product are described that predicts a time in which a participant of a group of participants may speak in a group meeting. The prediction is based in part on latency between each participant in the group of participants and learned voice patterns of each respective participant. Once a prediction is determined, a cue to speak or remain silent is provided as one of a visual or aural cue to the participant to speak during the group meeting. Predicting a time in which the participant of a group of participants may speak includes training a lingual processing model iteratively for each respective participant to learn voice patterns of participants.

20 Claims, 8 Drawing Sheets

(56) References Cited

U.S. PATENT DOCUMENTS

| | | | | |
|---|---|---|---|---|
| 9,237,238 | B2* | 1/2016 | Chu | H04M 3/568 |
| 10,186,254 | B2* | 1/2019 | Williams | G10L 15/04 |
| 2003/0129574 | A1* | 7/2003 | Ferriol | G09B 5/00 |
| | | | | 434/323 |
| 2014/0316768 | A1* | 10/2014 | Khandekar | G06F 16/3329 |
| | | | | 704/9 |
| 2016/0036962 | A1* | 2/2016 | Rand | H04M 1/656 |
| | | | | 455/418 |
| 2016/0255126 | A1* | 9/2016 | Sarris | H04L 65/1096 |
| | | | | 348/14.08 |
| 2020/0092519 | A1* | 3/2020 | Shin | G10L 17/00 |
| 2022/0182578 | A1* | 6/2022 | Sircar | G06V 40/165 |
| 2023/0125307 | A1* | 4/2023 | O'Connell | G10L 17/22 |
| | | | | 704/231 |

OTHER PUBLICATIONS

Unknown et al., "Audio Conference Call Etiquette", Cornell University, https://alumni.cornell.edu/wp-content/uploads/ilm_uploads/2017/08/ConferenceCallEtiquette.pdf, downloaded Oct. 25, 2021, 1 page.

Agnes Jozwiak, "I'm Talking Now! Avoid Speaking Over Others on a Conference Call", https://blog.clickmeeting.com/im-talking-now-avoid-speaking-others-conference-call, Mar. 11, 2015, 7 pages.

Anthony K. Tjan, "Don't Send That Email. Pick up the Phone!", https://hbr.org/2011/11/dont-send-that-email-pick-up-t.html, Nov. 1, 2011, 3 pages.

John White, "Ineffective Meetings Cost Companies Up to $283 Billion a Year (So Streamline Collaboration With These Tips)", https://www.inc.com/john-white/ineffective-meetings-cost-companies-up-to-283-billion-a-year-streamline-collaboration-with-these-tips.html. Aug. 19, 2021, 19 pages.

Jonathan Hui, "Speech Recognition—Acoustic, Lexicon & Language Model", https://jonathan-hui.medium.com/speech-recognition-acoustic-lexicon-language-model-aacac0462639, Sep. 15, 2019, 26 pages.

Mell et al., "The NIST Definition of Cloud Computing", NIST, Special Publication 800-145, Sep. 2011, 7 pages.

* cited by examiner

VIDEO CONFERENCE VERBAL JUNCTION IDENTIFICATION VIA NLP

BACKGROUND

Aspects of the present disclosure relate generally to a computer implemented method for identifying verbal junctions in a video or teleconference using natural language processing and, more particularly, to indicating to a conference participant when it may be an acceptable time to speak.

Video conference technology has become widely used as the cost of equipment, network connectivity and bandwidth have dropped overtime. Initially business grade video conferences required dedicated suites with expensive audio-visual and networking equipment and dedicated communications links making it only available to senior management of large corporations.

Currently, many mobile devices can deliver full video conferencing to any country with Internet access. As Internet bandwidth increases, the quality of the audio and video may be improved, but bandwidth increases alone cannot improve the user experience of the participants.

SUMMARY

In an embodiment, there is a computer-implemented method including: predicting a time in which a participant of a group of participants may speak in a group meeting based on latency between each participant in the group of participants and learned voice patterns of each respective participant; and providing one of a visual or aural cue to the participant to speak during the group meeting, wherein the predicting a time in which the participant of a group of participants may speak comprises training a lingual processing model iteratively for each respective participant to learn voice patterns of participants.

In another embodiment, there is a computer program product including one or more computer readable storage media having program instructions collectively stored on the one or more computer readable storage media. The program instructions are executable to: train a machine learning model, iteratively, for each respective participant of a group of participants in a group meeting to learn voice patterns of the participants; predict a time in which a participant of the group of participants may speak in the group meeting, based at least in part on latency between each participant in the group of participants and the learned voice patterns of each respective participant; and provide one of a visual or aural cue to the participant to speak during the group meeting.

In another embodiment, there is system including a processor, a computer readable memory, one or more computer readable storage media, and program instructions collectively stored on the one or more computer readable storage media. The program instructions are executable to: communicate with a conference server module managing a group meeting; identify a plurality of participants in the group meeting; monitor voice patterns of the plurality of participants in the group meeting; provide the monitored voice patterns of the plurality of participants to a machine learning model, wherein in response to receiving monitored voice patterns, the machine learning model is configured to revise stored voice patterns for the plurality of participants; receive latency information of the group meeting from the conference server module; identify a participant of the plurality of participants of the group meeting to speak next based in part upon the received latency information and voice patterns of the plurality of the participants; and provide a cue to speak next in the group meeting, wherein the provided cue is provided to a client device corresponding to the participant.

BRIEF DESCRIPTION OF THE DRAWINGS

Aspects of the present disclosure are described in the detailed description which follows, in reference to the noted plurality of drawings by way of non-limiting examples of exemplary embodiments of the present invention.

DETAILED DESCRIPTION

Figure 1:
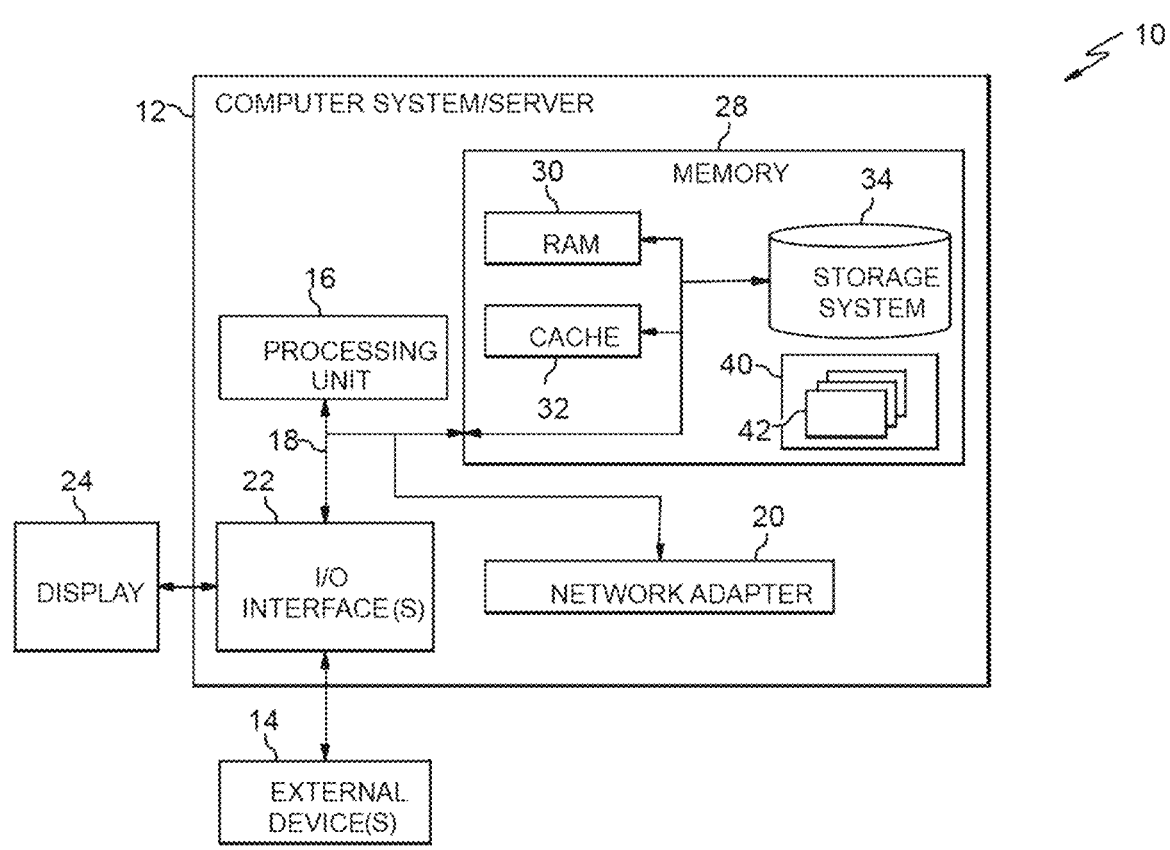
FIG. 1 depicts a cloud computing node, according to an embodiment.

Aspects of the present disclosure relate generally to a computer implemented method, system and computer program product for identifying verbal junctions in a video or teleconference using natural language processing identifiers and, more particularly, to indicating to a conference participant when it may be an acceptable time to speak. It will be understood that in various embodiments, audio may be present without video. The term "video conferencing" is used throughout to simplify the description but may refer to an audio-only conference. Further, as disclosed herein, a conference may be described as web-based or on-line, but it will be understood that various types of electronic communication networks may be used in implementation of embodiments.

Embodiments of the disclosure relate to improving the user experience in an audio and/or video teleconference. Existing systems exhibit some level of latency during use. Regardless of any increase in connectivity speed, latency will always exist due to geographic distances, and system delays in the hardware and software. Latency is the time taken for a message to travel from one participant to another. While human speech has evolved around participants' ability to understand when another participant in a conversation has stopped talking and a response is acceptable, or expected, when participants connect through a remote conferencing system, latencies make this ability to determine when to speak more difficult. In existing systems, participants often speak over one another or interrupt one another unintentionally. In a face-to-face conversation a participant may rely on their voice being carried through the air at the speed of sound. In this case, latency may be determined by the speed of sound which is around 340 m/s in most habitable environments. Assuming that participants in the conversation are standing no more the 1 meter (or yard) apart, the latency experienced is approximately 0.003 Seconds or 3 ms (milliseconds).

Embodiments of the disclosure use latency metrics and signals from a speaker using natural language processing (NLP) to indicate to a non-speaking participant, typically with a visual cue, that it is acceptable to begin speaking. In an embodiment, NLP may use stored speech patterns of the participants to help determine when speech is permissible. In an embodiment, speech may be monitored to enhance a speech pattern database.

In an embodiment, there is a computer-implemented method including: predicting a time in which a participant of a group of participants may speak (or otherwise use a microphone) in a web-based group meeting based on latency between each participant in the group of participants and learned voice, or speech, patterns of each respective participant, and providing a visual cue to the participant to speak during the web-based group meeting, wherein predicting a time in which a participant of a group of participants may speak comprises training a model of a machine learning model (e.g., lingual processing module and language processing learning modules) iteratively for each respective participant to learn voice patterns of participants.

In another embodiment, a computer implemented method includes predicting a time in which a participant of a group of participants may speak (or otherwise use a microphone) in a audio-only group meeting based on latency between each participant in the group of participants and learned voice patterns of each respective participant, providing one of an audible or visual cue to the participant to speak during the audio-only group meeting, and wherein predicting a time in which a participant of a group of participants may speak comprises training a model (e.g., lingual processing module and language processing learning modules) iteratively for each respective participant to learn voice patterns of participants. Other embodiments may be described and claimed herein.

Implementations of various embodiments may provide an improvement in the technical field of Web-based video conferencing. In particular, implementations automatically identify latencies and speech patterns of participants to suggest an acceptable time to speak for individual participants, thereby reducing wasted time of participants interrupting and speaking over one another to provide more efficient remote collaboration and improved user experience. Implementations may transform an article to a different state or thing. In particular, implementations may modify a visual display (or audio stream) for a participant to provide an indication of whether it is acceptable to speak that replaces (or overlays upon) portions of the video display or audio stream that would have been provided to the participant in systems of the current art. Speech patterns are monitored during conference calls and used in an NLP module to provide updates to a speech pattern database for use in determining when the indications are to be provided to a participant.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

It should be understood that, to the extent implementations of embodiments described herein, collect, store, or employ personal information provided by, or obtained from, individuals (for example, participants in a video or audio conference), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
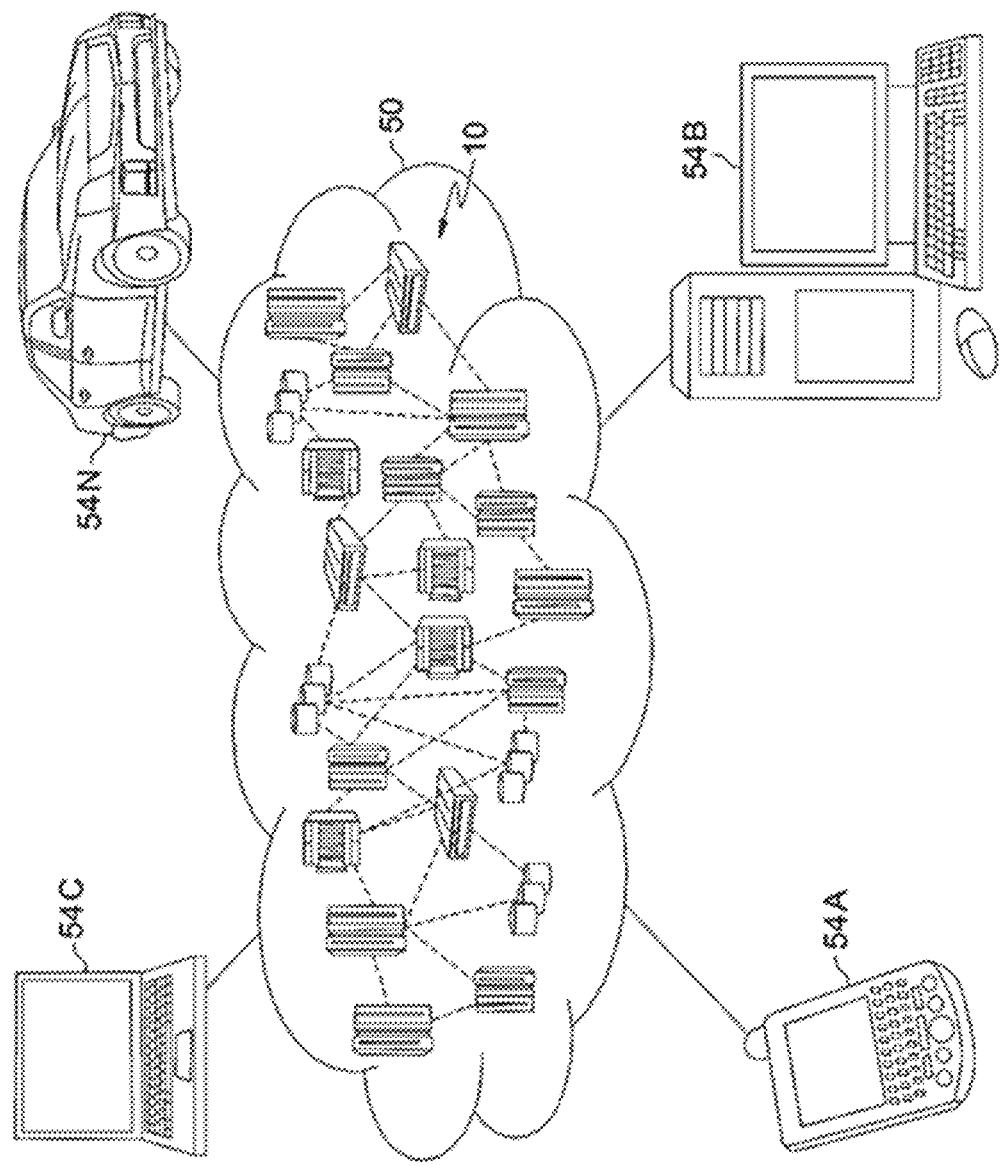
FIG. 2 depicts a cloud computing environment, according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
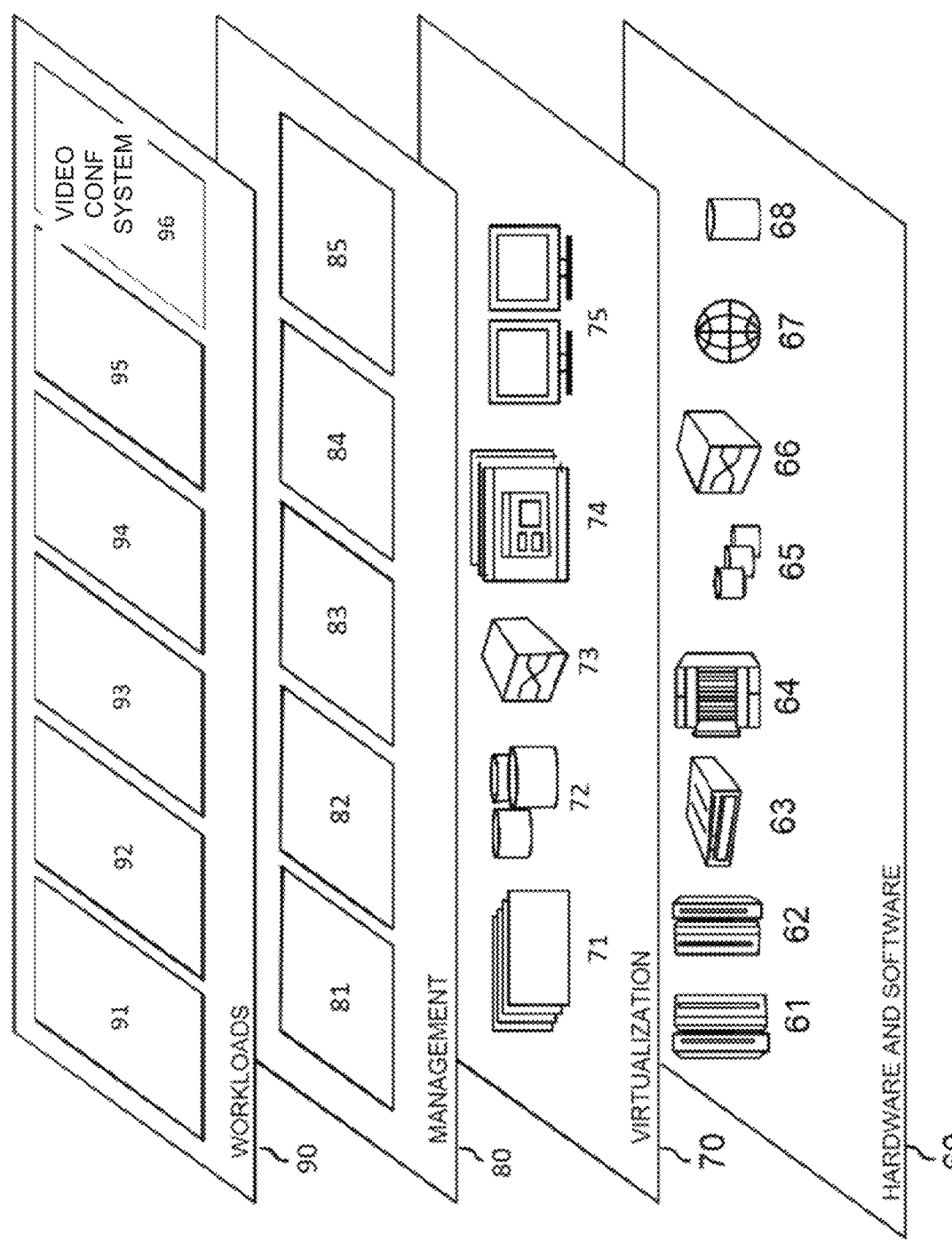
FIG. 3 depicts abstraction model layers, according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video conferencing system 96.

Implementations of embodiments may include a computer system/server 12 of FIG. 1 in which one or more of the program modules 42 are configured to perform (or cause the computer system/server 12 to perform) one of more functions of the video conferencing system 96 of FIG. 3. For example, the one or more of the program modules 42 may be configured to: measure latency in a video conference, monitor participant audio streams in the video conference, use natural language processing (NLP) on the monitored audio streams to identify pauses, exchanges between participants, track top talkers, and compute an optimal time to indicate when each participant should speak.

Figure 4:
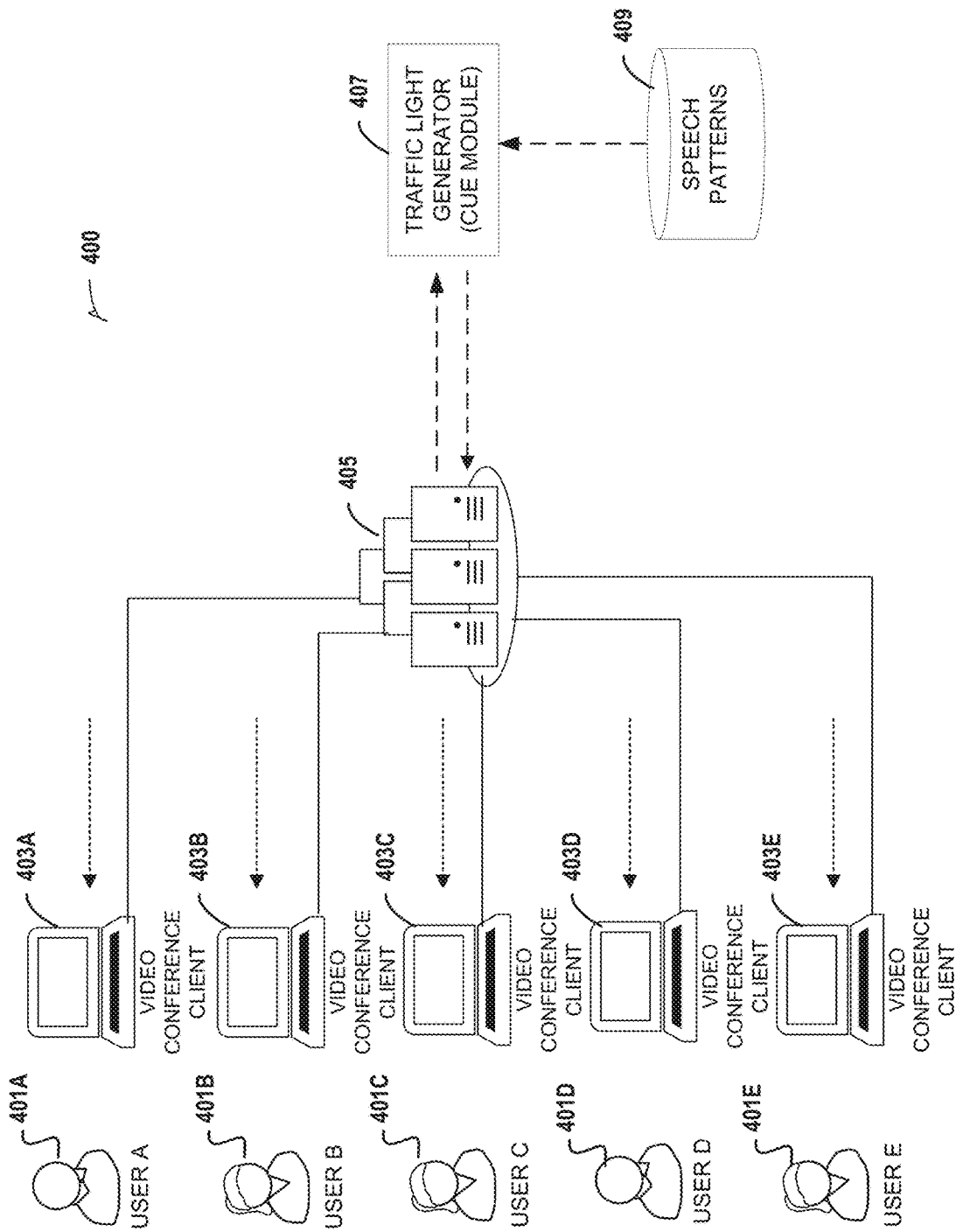
FIG. 4 shows a block diagram of an exemplary environment, according to an embodiment.

FIG. 4 shows a block diagram of an exemplary environment 400 in accordance with embodiments of the invention. In embodiments, the environment includes participants or users 401A-E. Each user may use a corresponding video client 403A-E. Video conferencing system 405 may include local and remote program modules 42 (FIG. 1) in a workload layer video conferencing system 96 (FIG. 3). The video conferencing system 405 may provide a user ID, location data and latency measurements to a program module for indicating whether it is acceptable for a user to speak. Current systems do not provide a satisfactory user experience when participants talk over one another or constantly interrupt one another. This talk over may be caused by many factors, including latency issues. Further, when participants interrupt or talk over one another, video conferencing becomes inefficient and prone to misunderstandings.

Figure 5:
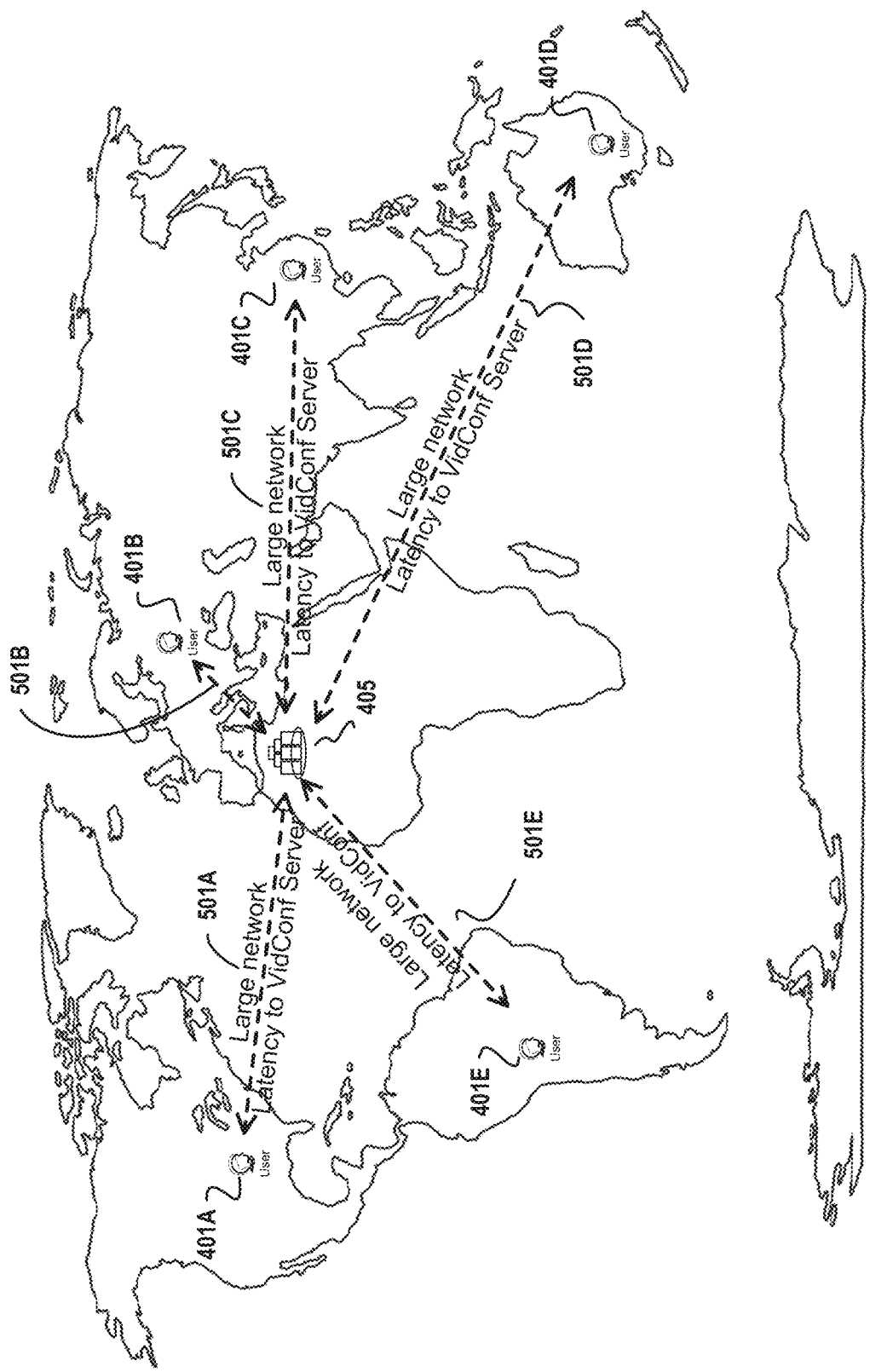
FIG. 5 shows a block diagram of an exemplary geographical representation of when latency can be introduced to a conferencing system, according to an embodiment.

Now referring to FIG. 5, there is shown an exemplary geographical representation of when latency can be introduced to a video conferencing system 405. It can be seen that Users 401A-E are located all around the world. Due to distances 501A-E from the users to the video conferencing system 405, and their respective hops through various network nodes in the communication network (not shown), each User 401A-E may experience a different level of latency.

Referring again to FIG. 4, latency measurements for each user are monitored and collected by the video conferencing system 405. The video conferencing system may include a sub-module identified as a "traffic light generator" 407. The term traffic light generator is symbolic of a typical road traffic signal with red, yellow, and green indicators. In this context, a red light would indicate that the user should not speak. A green light would indicate that it is safe for a user to speak. A yellow light might indicate that the user should wrap up their speech to let another speak or warn a user that their light is about to turn green, and they should unmute themselves. In implementation, the indicators may be visual, aural, appear as a traffic light with various colors (i.e., red, yellow and green), be textual, or appear as another type of visual cue to the user. The term "traffic light generator" will be used herein to be symbolic of any program module that generates a cue to the participants of the conference regarding whether one should speak, remain quiet, or prepare to speak. A synonymous term is a "cue generator."

The traffic light generator (TLG) module 407 may access a database 409 which contains speech patterns for users. An enterprise may collect speech patterns from participants in video conferences within the enterprise and store the patterns in the database 409. Each stored speech pattern may correspond to a different User ID. In an embodiment, an acoustic and language model may be extracted from one or more audio streams using an NLP to determine who is speaking and the type of speech. These speech patterns may be combined with a software model of latencies between active participants in the video conference to determine who is speaking and identify pauses in the speech, in real time. In an embodiment, speech patterns may include a mean or average delay in a user's speech pattern. The various aspects of a user's speech pattern may be assigned a statistical significance score. This score may be reinforced in real time during a conference by a recurrent neural network (RNN) in the NLP. Together, the NLP and latency model provide participation and speech information to the TLG 407 to indicate whether or not it is acceptable for a user to speak, by means of a visual indicator, or cue. In an embodiment, for instance for an audio-only conference, the indicator may be aural rather than visual. In an embodiment, a user may request an aural cue even when participating in a video conference, as a personal preference.

In an example, when the video conferencing system 405 identifies that Users 401 A-E are present in the conference, the User IDs and latency information for each user are sent to TLG 407. TLG 407 may then retrieve speech patterns specific to each user from the database 409. In an embodiment, TLG 407 monitors the audio streams from each user looking for pauses, and exchanges between specific parties. TLG 407 may track "top talkers" (e.g., users who speak most often or for the most time per meeting) using NLP. TLG 407 computes the optimal time to indicate a green light (speaking cue) for each user (i.e., when each user should speak). It will be understood that in various implementations, TLG 407 may be integrated into the video conferencing system 405 or be implemented as one or more remote processes or modules communicating with video conferencing system 405 either locally or through a communications network. It will be understood that in various implementations the speech pattern database 409 may be provided as a service by the video conferencing system 405 or be integrated into the TLG 407.

Figure 6:
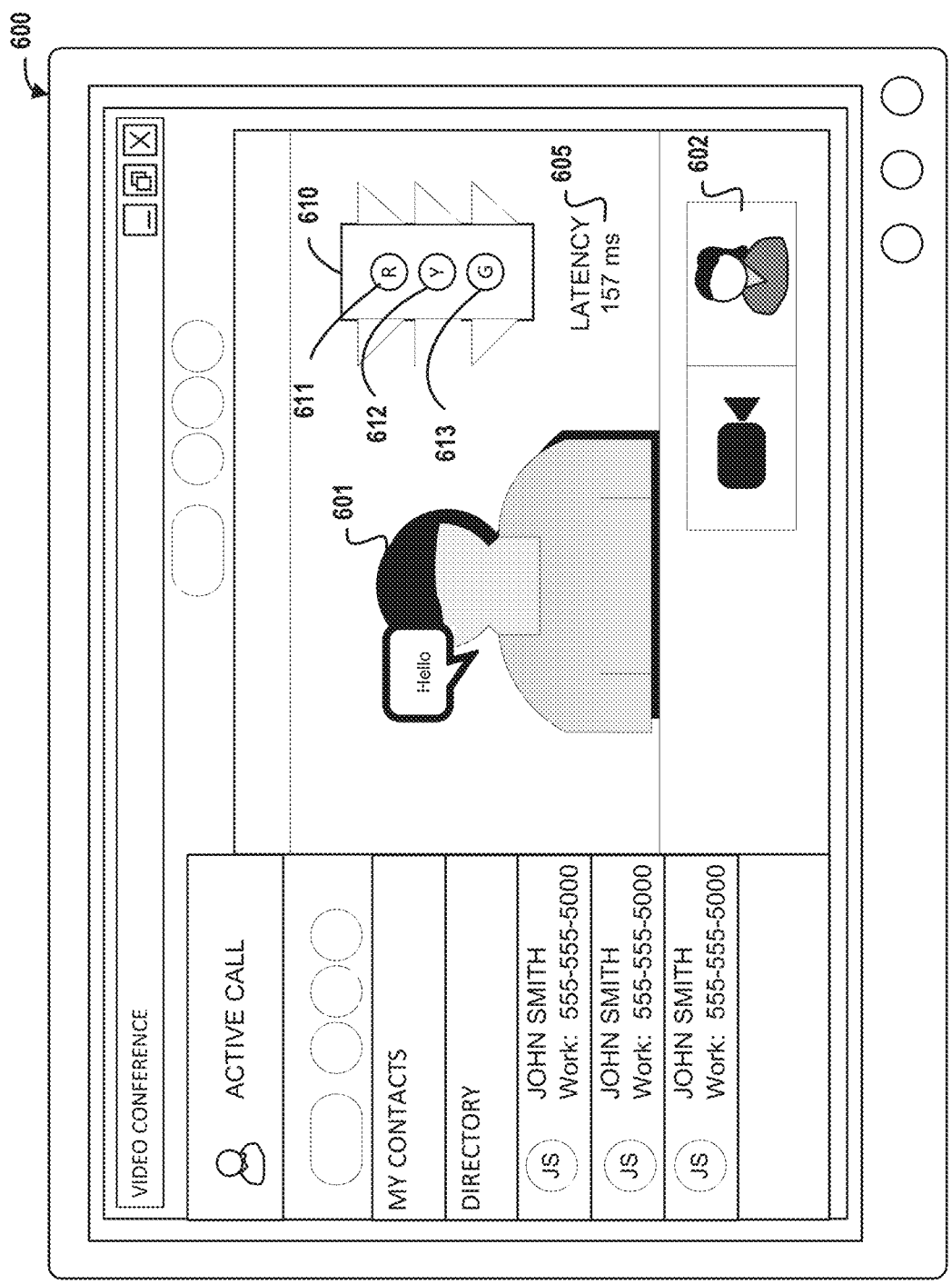
FIG. 6 is a block diagram representing a video display in an exemplary video conference, according to an embodiment.

FIG. 6 is a block diagram representing a video display 600 that a user might see during a video conference. In this example the user viewing this display is shown as a small video capture 602 of a rear facing camera (not shown). The speaking participant is shown in a larger video capture area 601. The visual cue for whether user 602 should begin speaking is shown as a traffic light 610. The traffic light 610 may include a red 611, yellow 612 and green 613 indicator. In an example, when a user should remain quiet, for instance when the speaker continues without pausing, the red indicator 611 may be lit up. It will be understood that other visual cues may be used rather than the symbolic traffic light. In an example, a text area may appear that displays "SPEAK NOW" or "REMAIN QUIET." In an audio-only conference, a voice may be heard by a single user that quietly says, "SPEAK NOW," or a series of beeps or sounds may be played to cue the user. The user's latency 605 may also be displayed in some embodiments, for reference.

Figure 7:
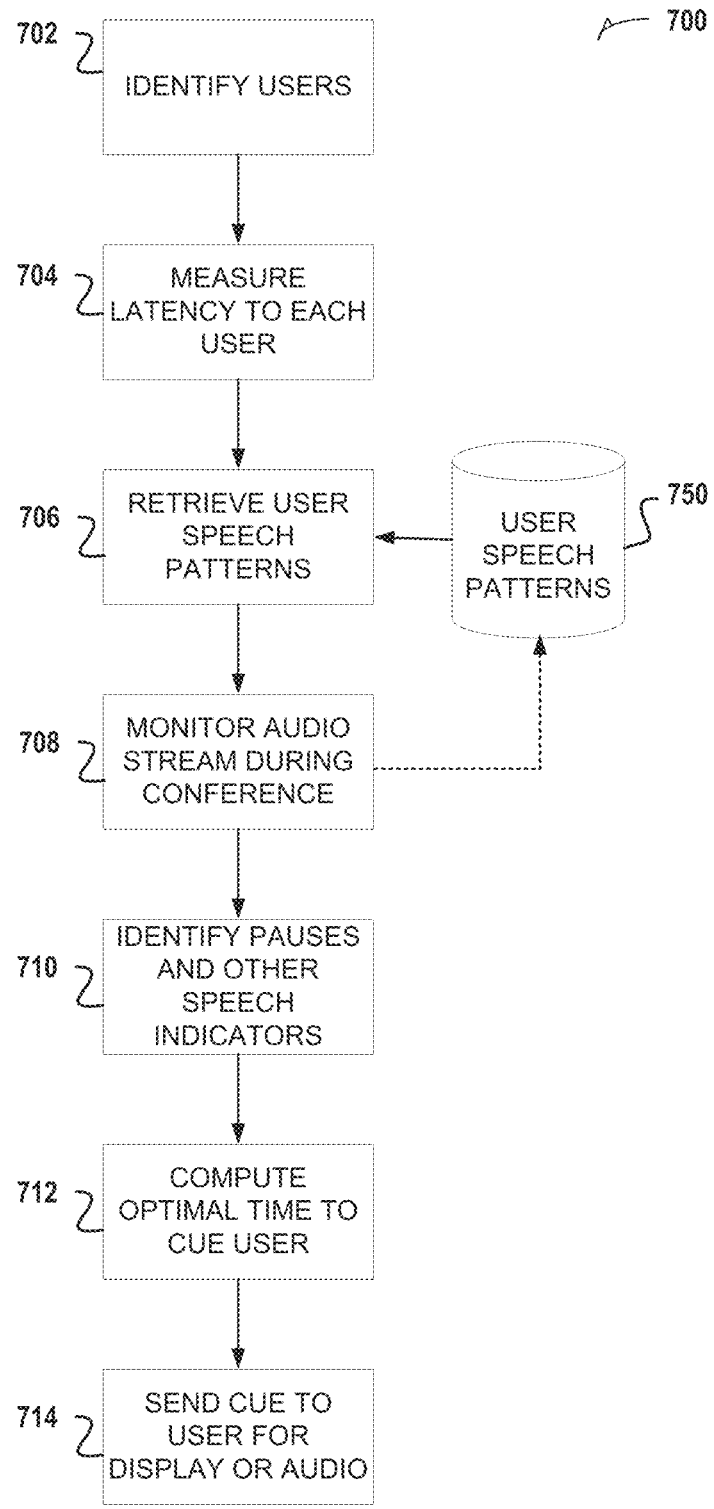
FIG. 7 shows a flow chart of an exemplary method for providing cues to participants of an on-line conference, according to an embodiment.

FIG. 7 shows a flow chart of an exemplary method 700 for providing cues to participants of a video conference, in accordance with aspects of the disclosure. Various operations of the method may be carried out in the environment of FIG. 4 and are described with reference to elements depicted in FIG. 4. In an example teleconference, Users 401A-E are present. The participating users 401A-E are identified by the video teleconference system 405 in block 702. Each user may be in a different geographic area and be at a different distance to the video conference server 405. Latencies in communication with each user due to distances, node hops on the network and hardware and software delays are measured in block 704. Some users may have their typical speech patterns already identified and stored in a user speech pattern database 750. Saved patterns for each user may be retrieved in block 706. The audio stream for the conversation flow in the teleconference is monitored in block 708. In an embodiment, a user's speech pattern may optionally be updated in the speech pattern database 750 if changes are identified during the conversation monitoring.

Figure 8:
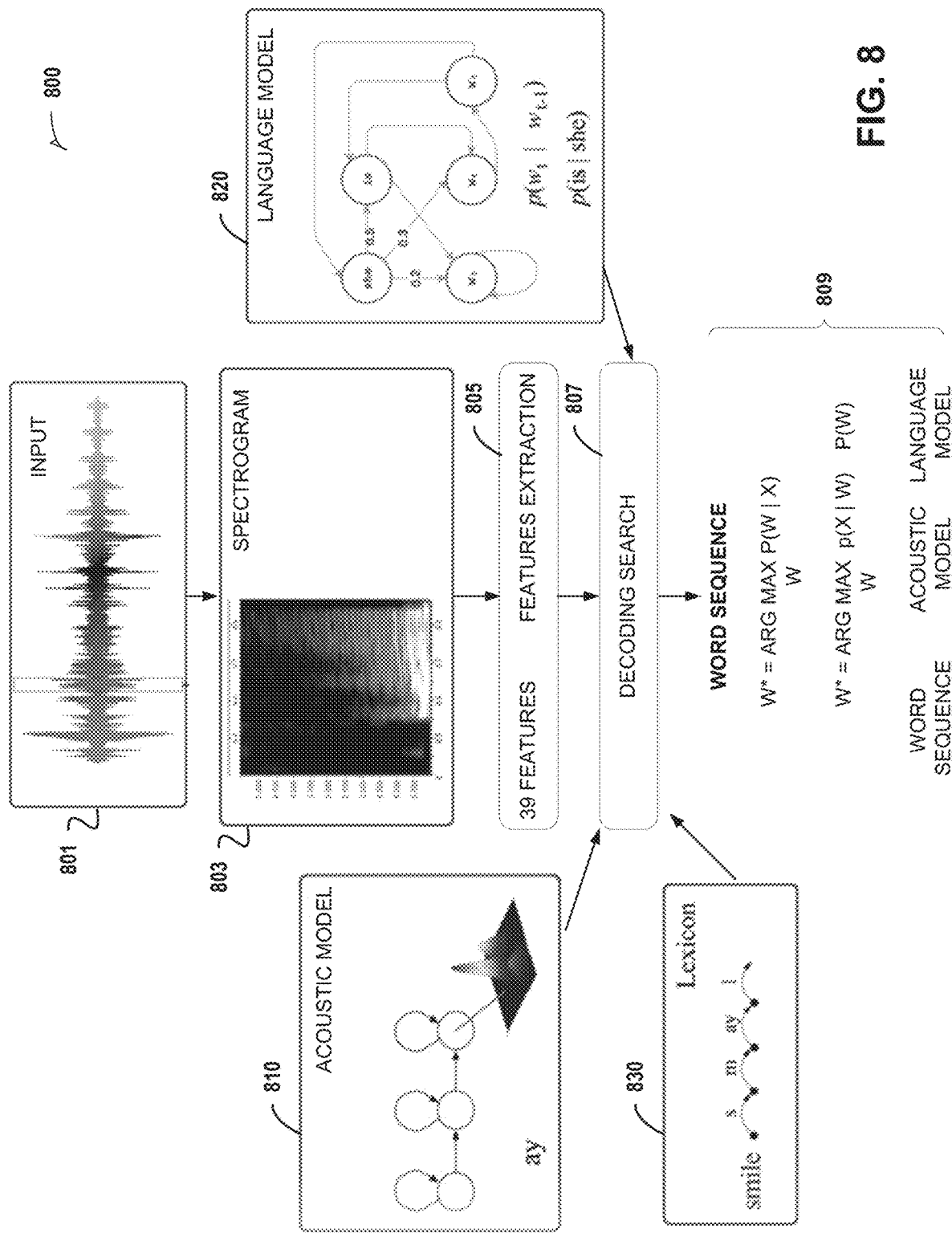
FIG. 8 shows a block diagram of an exemplary Natural Language Processing module identifying speech pattern of a user, according to an embodiment.

In an embodiment, speech patterns may be derived using an NLP module. Referring now to FIG. 8, there is shown a block diagram 800 of an exemplary NLP module identifying speech pattern of a user. It will be understood that discussion of this model is for illustrative purposes and that other speech models or NLPs may be used to implement embodiments as described herein. In an embodiment, the NLP may utilize a recurrent neural net (RNN) module for training and speech pattern identification. RNNs are typically self-training. In other embodiments, training of the model may be supervised.

Speech recognition can be viewed as finding the best sequence of words (W) according to the acoustic, the pronunciation lexicon and the language model. In an example, the audio stream is captured and used as input 801 to the RNN. A spectrogram of the audio stream is shown at 803 for illustrative purposes. The spectrogram illustrates that a user's speech may vary in frequency as present in the wave form 801. Intonation may be derived from the waveform input 801 and used to interpret a user's speech pattern. In speech, intonation is the use of changing (rising and falling) vocal pitch to convey grammatical information or personal attitude. In English speech, for instance, rising intonation means the pitch of the voice rises over time. Falling intonation means that the pitch falls with time. Dipping or fall-rise intonation falls and then rises. Peaking or rise-fall intonation rises and then falls. Identifying the various intonation patterns in a user's speech may indicate whether a user is asking a question, pausing for effect, about to finish speaking, etc.

The speech pattern corpus may be detected such as by a lingual processing module and trained learning such as a neural net on user's speech. The module typically outputs a classified standard speech pattern such as classifying each speech chunk as single party (user speaking) or multi-party (user speaking to others, waiting for response). The module may identify mean delay in speech patterns for conversations and derive standard deviations to that found mean. When the user is speaking, the module captures when the user falls outside of these standard deviations and uses it to alert the module of user state. In an embodiment, the speech pattern corpus may be tied to not just a user, but to a unique device as well (i.e., a cellphone, laptop, or Bluetooth earbuds, etc.) that may affect the speech speed. In an embodiment, a user's speech pattern may correspond to the device they are using to connect to the conference. For instance, a user may take more time to find the unmute option on a mobile phone than on their computer. These mean latencies associated with differing pauses may factor into user state.

In an embodiment, a linguistic model may capture how a user speaks, i.e., their intonation when ending in a question, their mean time before a follow-up question is asked, the user's mute status, and the network latency of the user. By capturing derived information such as the aforementioned components, the model may rank and predict an optimum speech time and show this to the user by means of a stoplight style artifact. For example, linguistically, some people may frequently ask follow-up questions after an initial interrogatory sentence. The disclosed linguistic module may track a user's history and how the pattern compares to this type of speech pattern. In an example a user may say, "'So where are we with the Q1 results? . . . Do we have those numbers?" or "what time are you planning on sending the RFP? . . . I want to do some review of it before the deadline."

It can be seen that the user's linguistical pattern of interrogatory sentences often have follow-up a few seconds later. Without the disclosed linguistic module, a user participating in the conversation may read the initial pause as time to speak up and then talk over the initial speaker. Embodiments measure the latency of each user, common linguistics, and analysis of past conversations, know a user's mean response time, and then provide an indicator to a user to speak if it is likely that all speaking or participating parties are finished speaking. The acoustic analysis of the user's intonation, the linguistic processing of the user's speech pattern, and the latency between the parties added as a buffer drives this automatic cuing (indication).

In an embodiment, factors that are used to determine whether to cue a user to speak may include: length of time before follow-up after a question is asked; how long a user waits before saying something if there is no response; determine whether a question is complete using intonation; mean time to un-mute one's microphone; median latency on the network; and standard response time to questions. In an embodiment, text of historical conversations may be timestamped for linguistic analysis. Each user may have one of more of these historical patterns saved in their speech pattern profile. An indicator or cue may be based on the speaker's current speech and how it compares historically to the median for the above indicators. Each factor may have a predetermined weight associated with its importance in making the cue determination. These weights may be manually adjusted or change dynamically based on automatic training of the machine learning model, i.e., language processing training model. The TLG module 407 (FIG. 4) may use a feedback loop for accuracy based on detection of audio collisions to decrease the aggregate of collisions in a conversation.

Features of the user's speech may be extracted in a feature extraction module 805. An acoustic model 810 may be used to identify intonation, pauses, etc. The acoustic model may identify the speaker, the type of speech, i.e., monologue, dialog, question, pause, etc. A network latency tracker may be used along with the acoustic model to identify pauses in speech as compared to pauses due to latency factors. The extracted features may be utilized with the results of the acoustic model 810, as well as a language model 820 and lexicon model 830 in a decoding search module 807 to identify word sequences 809 and context of the audio stream. A lexicon model is a part of any automatic speech recognition (ASR). The lexicon is simply a set of words with their pronunciations broken down into phonemes, i.e., units of word pronunciation. Once the lexicons are recognized in 830, the language model 820 may calculate the likelihood of a sequence of words and improve accuracy in ASR. In an embodiment, the NLP may be trained using either a supervised or unsupervised machine learning model. The machine learning model may either be cloud based or integrated with the video conference system 405 (FIG. 4) or a hybrid of both.

Referring again to FIG. 7, latencies for the user speaking are combined with pauses in speech and other speech indicators, such as intonation in block 710 to help identify whether the user is pausing for effect or is pausing to let another speak. For instance, if a rising intonation in a user's speech pattern is historically interpreted as the user is asking a question, then the TLG 407 (FIG. 4) may determine that it is about time to cue another to speak, perhaps to answer the question. If a user appears to pause, but the typical latency is longer than the pause time, the TLG 407 may delay cuing another that it is time to speak.

The optimal time to cue a user to speak is computed in block 712. In an embodiment, various metrics are collected during the conversation and utilized to compute the time to cue. For instance, historical latency values, user speech patterns and acoustic processing are used in the computation. When talking with other people on conference calls, just knowing that there is a silence (or pause in speech) is not enough to accurately indicate when it is safe for another user to speak. Embodiments disclosed herein capture how a user speaks, i.e., their intonation when ending in a question, their mean time before a follow-up question is asked, the user's mute status in the conference call, and the network latency. A ranking can be used to predict an optimum speech time and then provide a visual or aural cue to the top ranked next speaker. For instance, if the speech pattern for a specific conversation indicates that when User A 401A asks a question that 80% of the time the next user to speak is User C 401C, then User C may have a higher associated rank than the other users in the conversation. This ranking may result in the User C 401C receiving a speak cue, e.g., a green light 613 (FIG. 6), after User A 401A asks a question indicated by rising intonation and a pause. If User C 401C does not respond/speak within a predetermined interval, then the next highest ranked user may be cued to speak, e.g., with a green light. In an embodiment, when a cued user fails to speak, that user's traffic light is turned red 611 (FIG. 6) before cuing a next user to speak. In an embodiment, ranking of a user may be weighted based on their mute status, meeting host status, seniority in the enterprise, historical speaking time during meetings, and other factors. In an embodiment, more than one user may be cued to speak during a pause. When a user begins to speak, other user's cues are changed to red, e.g., do not speak cue. Each user may be provided a cue after the same or different delay times.

The computation of the optimal time to cue user includes various factors. For instance, metrics collected to aid in determining whether or not to cue a user that it may be an acceptable time to speak may include, but are not limited to: communication mode (i.e., monologue/presentation, dialogue, open discussion); hardware, software and geographic latencies; speech context (e.g., intonation, stored speech patterns, natural language understanding of conversational context); mute status, and meeting host status. These factors may be captured at the per user level, thus collecting metrics for the current user who wants to speak, and the user who was previously speaking. It will be understood that at any one time there may be only one active communication mode for a meeting, but latency factors for multiple users. Thus, the user level factors may be pulled in aggregate for each user's unique latency score. It will also be understood that the communication mode for a meeting may change over time for the same meeting. For instance, the meeting may start as a presentation mode type of communication and change into a dialog or open discussion mode.

Metrics may be collected based on a number of factors and criteria. In an embodiment, the following factors may be defined and used in the cuing computation.

Physical Location Latency Speaker—This is the network latency between the speaker and the centralized server.

On Mute—Binary value of 1 or 0.1 means the user is on digital mute (Conference mute) so it adds time to unmute and speak after receiving a cue.

Previous speaker User speech pattern modifier—Higher values means the user takes longer to respond or has more natural breaks in their speech.

Audio Input Modifier—Higher value means the user has an accessory that takes longer to interact with. For instance, if the user is on physical mute (Cell phone mute button pressed) or if the user is using an accessory to communicate with which it takes longer to interact (i.e., like grabbing a lapel microphone).

Background noise—Higher value means more background noise.

Discussion pattern—Multiple values. For instance, 0 may mean the user is monologuing; 1 may mean the user is in a dialogue; and 2 may mean the user is active in an open discussion with multiple speakers popping in and out.

NLP Modifier—The modifier is based on if the user has said something indicating a request for feedback from other participants, such as, "So does anyone have questions?"

Global mute modifier—this value captures how many other people recently came on mute during the pause, higher means more people.

Mean speaker pause interjection—an average value calculated from many other meetings that captures the average amount of time that the speaker allows silence to go on before they speak up again.

User manual Preference—a value the user may manually have as a modifier to their red, green, yellow time.

An exemplary scenario is discussed below for illustrative purposes. In an example a meeting is held with three participants: Participants A-C. Participant B is giving a presentation, as captured by the NLU/NLP module, which also calculates his speaking time at 300 ms. Participant B is in Australia with a 230 ms latency to the other users in the U.S., due to distance. Participant B tends to speak very fast with large pauses after finishing each speaking point. Participant B has no background noise, so 0 ms is calculated for this metric. The NLU identifies that Participant B has asked for questions which adds 0 ms.

Participant A is in Texas, USA which adds 120 ms latency. In an embodiment, each participant has a cuing module local to their video client. Participant A's cuing module detects that no other participants have unmuted themselves which adds 0 ms. Participant C is also in Texas, USA but exhibits a latency of 118 ms. During the call, Participant C's cuing module detects that Participant A has clicked the unmute button and adds a 400 ms delay. Therefore, a wait threshold for Participant A to speak is 300 ms+230 ms+120 ms=650 ms, which represents the speaking time of Participant B, the geographic latency of Participant B and the geographic latency of Participant A.

In this example, Participant A may have his thresholds for red, yellow, and green cuing indicators set as follows. Any wait time below 650 ms will result in a red cue not to speak. Anything above 650 ms may be yellow until the time exceeds 20% above the 650 ms threshold, which will be green, indicating that it is safe for Participant A to speak.

In this example, Participant C has a cuing threshold of 300 ms+230 ms+118 ms+400 ms=1048 ms, which represents the speaking time of Participant B, the geographic latency of Participant B, the geographic latency of Participant C, and the clicking of the unmute button of Participant A. In this example, the cuing module identifies that Participant A is likely to speak after clicking the unmute button so that a delay is built in for Participant C to wait. If Participant A does not speak in the expected time, then Participant C may be given a yellow cue at 1048 ms. In this example, any delay shorter than 1048 ms will keep Participant C as red. And a wait time of at least 20% more than the 1048 ms threshold will provide a green cue to Participant C.

In an embodiment, the various latencies are summed to provide a minimum threshold for a user to be given a speaking cue. Context of the speech, communication mode and other factors may provide additional delays in the cuing threshold for a participant, and/or a multiplier or weight for other factors in the threshold. The 20% additional delay calculation described above may be modified by user preference or when the NLP detects long pauses or talk-over and learns a more optimum multiplier.

The cue to speak is sent to the various user or users in block 714. The cuing of either a single user or multiple users may depend on the communication mode of the meeting, geographic location of the user, native language of the user, or other predetermined criteria. For instance, in a presentation type meeting, when the presenter pauses, all other users may be given a green light cue to allow for questions. In a meeting which is classified as more of a back-and-forth dialog between two participants, the non-speaking active participant may be given a green light with a shorter delay than speakers who have remained silent for most of the meeting. It will be understood that classification of meeting type may differ by organization and wait times may be automatically adjusted by self-training of the speech models or be manually updated.

In an embodiment, ranking may be overruled using context in the speech recognition by utilizing natural language understanding (NLU). For instance, in cases where the system cannot automatically determine the natural breaks in conversation due to speech falling outside of the usual patterns, the system may use voice recognition during overlapped communication. In this case, the module may look for phrases such as "go ahead" or "you first" and will then modify the speak indicator so that the other party in overlapped communication is given the indication it is their turn to speak, even if they were lower ranked. It should be noted that embodiments as disclosed herein automatically identify which user should be given the cue to speak next without relying on a manual user request, such as a virtual hand raise, or require the host to unmute the user to give permission to speak.

In an embodiment, geographic variations of voice patterns may be applied based on the country of origin of the user. For instance, if a User E 401E is located in South America (see FIG. 5), it may initially be assumed that the user's first language is either Spanish or Portuguese. In this case, expected latencies may be adjusted so that a non-native language participant can digest and understand a native language speaker's speech. In this way, the non-native language participant won't have to start listening to a second speaker before they have mentally translated and understood the speech of the first speaker.

It will be understood that in some embodiments, a meeting may comprise users from within an organization and from outside the organization. In this case, historic speech patterns may not be available for external participants. It may be that some members of the organization may have opted out of storing their historic speech pattern or are new users. In an embodiment, the NLP may be integrated with the video conferencing system 405 and operate outside of the participants' enterprise or organization. In this case, some frequent users may have opted-in or out of speech pattern persistence in a database. It will be understood that when a user does not have a saved speech pattern, a temporary-only speech pattern may be generated for use in the current video conference and be deleted or disappear when the user leaves the meeting. In this case, the user ID in the meeting may be used to identify the speech pattern with no other identifiable user information other than perhaps location and hardware/software latencies.

In embodiments, an enhanced video conferencing system comprises a video conference module 405, a latency tracking module 704, a speech pattern recognition module 800, a traffic light generator module 407, each of which may comprise one or more program modules such as program modules 42 described with respect to FIG. 1. The enhanced video conferencing system may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4. For instance, the TLG 407 may be integrated into the video conferencing system 405 or be implemented as add-on modules or communicate remotely through a communication network to the video conferencing system 405 and Users' video conferencing clients 403A-E In embodiments, a service provider could offer to perform the processes described herein. In this case, the service provider can create, maintain, deploy, support, etc., the computer infrastructure that performs the process steps of embodiments of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, embodiments of the invention may provide a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
predicting a time in which a participant of a group of participants may speak in a group meeting based on latency between each participant in the group of participants and learned voice patterns of each respective participant; and
providing one of a visual or aural cue to the participant to speak during the group meeting, wherein the predicting a time in which the participant of a group of participants may speak comprises training a lingual processing model iteratively for each respective participant to learn voice patterns of participants.

2. The computer-implemented method as recited in claim 1, wherein the predicting a time in which a participant of a group of participants may speak further comprises:
classifying a communication mode of the group meeting; and
ranking the group of participants based on identified pauses in speech and the communication mode, wherein a higher ranked participant is to receive a speaking cue earlier than a lower ranking participant.

3. The computer-implemented method as recited in claim 2, wherein the communication mode is selected from the group of communication modes consisting of presentation mode, dialogue mode, and open discussion mode.

4. The computer-implemented method as recited in claim 1, wherein the learned voice patterns of each respective participant include at least one factor selected from the group of factors consisting of: user ID, mean delay in speech, wherein the mean delay corresponds to a device type used in the group meeting, native language, average wait time before speaking, and intonation in lingual patterns, and wherein historical learned voice patterns of each respective participant are updated responsive to changes in the speech patterns of the participant as exhibited during the group meeting.

5. The computer-implemented method as recited in claim 4, wherein predicting a time in which a participant of a group of participants may speak further comprises:
modifying an initial cuing time to speak for a participant based on an identified native language of the participant, responsive to identifying that the native language of the participant is a different language than a native language of a current speaker in the group meeting; and
providing the modified initial cuing time to the participant to speak.

6. The computer-implemented method as recited in claim 4, further comprising:
comparing a measured intonation of a speaker with historical intonation lingual patterns in the learned speech patterns of the speaker to determine whether the speaker is likely to continue speaking;

responsive to a determination that the speaker is not likely to continue speaking, predicting a time in which a participant of a group of participants may speak; and
responsive to a determination that the speaker is likely to continue speaking, waiting to predict a time in which a participant of the group of participants may speak.

7. The computer-implemented method as recited in claim 4, further comprising:
using natural language understanding on speech of a current speaker to derive a context for the speech; and
ranking the participants in the group of participants based on the context of the speech, wherein criteria used to determine a ranking includes at least one of: mute status of the participant, meeting host status of the participant, seniority of the participant in an enterprise associated with the group meeting, and historical speaking time of the participant during group meetings.

8. A computer program product comprising:
one or more computer readable storage media having program instructions collectively stored on the one or more computer readable storage media, wherein the program instructions are executable to:
train a machine learning model, iteratively, for each respective participant of a group of participants in a group meeting to learn voice patterns of the participants;
predict a time in which a participant of the group of participants may speak in the group meeting, based at least in part on latency between each participant in the group of participants and the learned voice patterns of each respective participant; and
provide one of a visual or aural cue to the participant to speak during the group meeting.

9. The computer program product as recited in claim 8, wherein the program instructions are further executable to:
classify a communication mode of the group meeting; and
rank the group of participants based on identified pauses in speech and the communication mode, wherein a higher ranked participant is to receive a speaking cue earlier than a lower ranking participant.

10. The computer program product as recited in claim 9, wherein the communication mode is selected from the group of communication modes consisting of presentation mode, dialogue mode, and open discussion mode.

11. The computer program product as recited in claim 8, wherein the learned voice patterns of each respective participant include at least one factor selected from the group of factors consisting of: user ID, mean delay in speech, wherein the mean delay corresponds to a device type used in the group meeting, native language, average wait time before speaking, and intonation in lingual patterns, and wherein historical learned voice patterns of each respective participant are updated responsive to changes in the speech patterns of the participant as exhibited during the group meeting.

12. The computer program product as recited in claim 11, wherein the program instructions are further executable to:
modify an initial cuing time to speak for a participant based on an identified native language of the participant, responsive to identifying that the native language of the participant is a different language than a native language of a current speaker in the group meeting; and
provide the modified initial cuing time to the participant to speak.

13. The computer program product as recited in claim 11, wherein the program instructions are further executable to:

compare a measured intonation of a speaker with historical intonation lingual patterns in the learned speech patterns of the speaker to determine whether the speaker is likely to continue speaking;
responsive to a determination that the speaker is not likely to continue speaking, predict a time in which a participant of a group of participants may speak; and
responsive to a determination that the speaker is likely to continue speaking, wait to predict a time in which a participant of the group of participants may speak.

14. The computer program product as recited in claim 11, wherein the program instructions are further executable to:
derive a context for speech of a current speaker of the group of participants using a natural language understanding model; and
rank each of the participants in the group of participants based on the context of the speech, wherein criteria used to determine a ranking includes at least one of: mute status of the participant, meeting host status of the participant, seniority, or role of the participant in an enterprise associated with the group meeting, and historical speaking time of the participant during group meetings.

15. A system comprising:
a processor, a computer readable memory, one or more computer readable storage media, and program instructions collectively stored on the one or more computer readable storage media, the program instructions executable to:
communicate with a conference server module managing a group meeting;
identify a plurality of participants in the group meeting;
monitor voice patterns of the plurality of participants in the group meeting;
provide the monitored voice patterns of the plurality of participants to a machine learning model, wherein in response to receiving monitored voice patterns, the machine learning model is configured to revise stored voice patterns for the plurality of participants;
receive latency information of the group meeting from the conference server module;
identify a participant of the plurality of participants of the group meeting to speak next based in part upon the received latency information and voice patterns of the plurality of the participants; and
provide a cue to speak next in the group meeting, wherein the provided cue is provided to a client device corresponding to the participant.

16. The system as recited in claim 15, wherein the conference server module is communicatively coupled to at least one storage media storing historical voice patterns of at least one participant in the group meeting, and wherein the stored voice patterns are to be iteratively updated based on the monitored voice patterns of the group meeting.

17. The system as recited in claim 15, wherein the conference server module is communicatively coupled over a network to a cuing module, wherein the cuing module is configured to generate the cue to speak to participants.

18. The system as recited in claim 15, wherein the conference server module is integrated with a cuing module, wherein the cuing module is configured to generate the cue to speak to participants.

19. The system as recited in claim 15, wherein the stored voice patterns of each respective participant include at least one factor selected from the group of factors consisting of: user ID, mean delay in speech, wherein the mean delay corresponds to a device type used in the group meeting, native language, average wait time before speaking, and intonation in lingual patterns, and wherein historical learned voice patterns of each respective participant are updated responsive to changes in the speech patterns of the participant as exhibited during the group meeting.

20. The system as recited in claim 19, wherein the cuing module includes program instructions to:
  compare a measured intonation of a speaker with historical intonation lingual patterns in the stored speech patterns of the speaker to determine whether the speaker is likely to continue speaking;
  responsive to a determination that the speaker is not likely to continue speaking, predict a time in which a participant of a group of participants may speak; and
  responsive to a determination that the speaker is likely to continue speaking, wait to predict a time in which a participant of the group of participants may speak.

* * * * *